US012607401B2

(12) United States Patent
Maczeyzik et al.

(10) Patent No.: US 12,607,401 B2
(45) Date of Patent: Apr. 21, 2026

(54) METHOD AND DEVICE FOR DRYING A COMPONENT INTERIOR

(71) Applicant: Carl Zeiss SMT GmbH, Oberkochen (DE)

(72) Inventors: Arvid Maczeyzik, Aalen (DE); Patrick Paul, Ulm (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 703 days.

(21) Appl. No.: 17/958,574

(22) Filed: Oct. 3, 2022

(65) Prior Publication Data

US 2023/0026447 A1 Jan. 26, 2023

Related U.S. Application Data

(63) Continuation of application No. PCT/EP2021/058658, filed on Apr. 1, 2021.

(30) Foreign Application Priority Data

Apr. 8, 2020 (DE) ......................... 102020204545.3

(51) Int. Cl.

| | |
|---|---|
| ***D06F 58/38*** | (2020.01) |
| ***B26B 3/06*** | (2006.01) |
| ***C23C 14/56*** | (2006.01) |
| ***D06F 58/40*** | (2020.01) |
| ***F26B 3/06*** | (2006.01) |
| ***F26B 21/08*** | (2006.01) |
| ***F26B 21/10*** | (2006.01) |

(52) U.S. Cl.
CPC ................ *F26B 3/06* (2013.01); *F26B 21/08* (2013.01); *F26B 21/10* (2013.01)

(58) Field of Classification Search
CPC .. F26B 3/06; F26B 21/08; F26B 21/10; C23C 14/564; C23C 23/4401
USPC .............................. 34/360, 250; 426/523, 45
See application file for complete search history.

(56) References Cited

U.S. PATENT DOCUMENTS 5,345,814 A * 9/1994 Cur ....................... G01M 3/202 73/49.3
2004/0222383 A1 11/2004 Kawakami
(Continued)

FOREIGN PATENT DOCUMENTS

CN 109282631 A * 1/2019 ............ F26B 21/083
DE 10 2018 212 195 A1 9/2018
(Continued)

OTHER PUBLICATIONS

English copy of CN 109282631 by PE2E Jul. 7, 2025.*
(Continued)

*Primary Examiner* — Deming Wan
(74) *Attorney, Agent, or Firm* — Fish & Richardson P.C.

(57) ABSTRACT

A method for drying a component interior of a component can be used in a lithographic process chain. The method includes a first drying step, in which simultaneously heated air is admitted into a component interior through an inlet, and the heated air is sucked out of the component interior through an outlet. The method also includes a succeeding second drying step, in which the inlet for the heated air is closed and the air is sucked out of the component interior, resulting in a reduced pressure is generated in the component interior.

20 Claims, 5 Drawing Sheets

(56) References Cited

U.S. PATENT DOCUMENTS

| | | | | |
|---|---|---|---|---|
| 2005/0017198 | A1 | 1/2005 | Van Der Net et al. | |
| 2006/0272174 | A1 | 12/2006 | Hartig | |
| 2010/0229420 | A1* | 9/2010 | Garrido | F26B 25/22<br>34/493 |
| 2013/0155380 | A1 | 6/2013 | Van Der Gaag et al. | |
| 2015/0121718 | A1* | 5/2015 | Huang | D06F 58/206<br>34/524 |

FOREIGN PATENT DOCUMENTS

| | | | | |
|---|---|---|---|---|
| DE | 102017207461 | A1 * | 11/2018 | B81B 7/0087 |
| DE | 10 2019 201 534 | A1 | 3/2019 | |
| DE | 10 2019 219 290 | A1 | 3/2020 | |
| EP | 0357189 | A2 * | 3/1990 | A47L 7/0042 |
| KR | 10-2017-0054631 | A | 5/2017 | |
| TW | 200530761 | A | 9/2005 | |
| TW | 201335723 | A | 9/2013 | |

OTHER PUBLICATIONS

English copy of DE102017207461 by PE2E Jul. 7, 2025.*

English copy of EP0357189 by PE2E Jul. 7, 2025.*

International Search Report and Written Opinion for corresponding PCT Appl No. PCT/EP2021/058658, dated Jun. 29, 2021.

Office Action in corresponding European Appln. No. 21717783.1, dated Feb. 24, 2025, 8 pages.

Notice of Allowance in Taiwanese Appln. No. 110111520, mailed on Oct. 28, 2022, 4 pages (with English translation).

Search Report in Taiwanese Appln. No. 110111520, mailed on Oct. 28, 2022, 3 pages (with English translation).

Office Action in Korean Appln. No. 10-2022-7038209, mailed on Nov. 5, 2025, 11 pages (with English translation).

* cited by examiner

METHOD AND DEVICE FOR DRYING A COMPONENT INTERIOR

CROSS-REFERENCE TO RELATED APPLICATIONS

The present application is a continuation of, and claims benefit under 35 USC 120 to, international application PCT/EP2021/058658, filed Apr. 1, 2021, which claims benefit under 35 USC 119 of German Application No. 10 2020 204 545.3, filed Apr. 8, 2020. The entire disclosure of these applications are incorporated by reference herein.

FIELD

The present disclosure relates to a method and a device for drying a component interior of a component which finds application and is usable in a lithographic process chain.

BACKGROUND

Microlithography is used for producing microstructured components, for example inters grated circuits. The microlithography process is carried out using a lithography apparatus comprising a light source (for example a laser source or a plasma source), an illumination system and a projection system. The image of a mask (reticle) illuminated via the illumination system is in this case projected via the projection system onto a substrate (for example a silicon wafer) which is coated with a light-sensitive layer (photoresist) and arranged in the image plane of the projection system, in order to transfer the mask structure to the light-sensitive coating of the substrate.

Some components of the lithography apparatus, such as the collector unit, for example, may sometimes be cooled with water during operation. During the maintenance of some components of the lithography apparatus, such as the collector unit of the lithography apparatus, for example, it may be necessary to check the tightness of the component. Tightness tests carried out using helium involve, for example, the interior of the component to be completely dry. For this purpose, it can be important to dry the component interior efficiently and completely and, in particular, to extract the cooling water again from the components.

It is known that a certain degree of drying can be achieved by blowing compressed air through the component to be dried. However, if internal lines of the component are clogged or blocked, with this approach there is the risk of a great increase in pressure in the component interior, which can result in the component being damaged or destroyed. Moreover, blowing compressed air through the component does not generally result in a sufficient degree of drying for the tightness test.

As an alternative, there is also the possibility of pumping out the component to be dried. However, this can involve using a water separator is upstream of the pump, possibly involving regularly emptying. In addition, residual liquid in the component interior can freeze and plug possible leaks. The component may then be assessed incorrectly as being dry and possibly also incorrectly as being tight.

SUMMARY

The present disclosure seeks to provide improved drying of a component interior.

In accordance with a first aspect, a method for drying a component interior of a component which finds application in a lithographic process chain is proposed. The method comprises: a first drying step, in which simultaneously heated air is admitted (for example blown) into the component interior through an inlet and the heated air is sucked out of the component interior through an outlet; and a succeeding second drying step, in which the inlet for the heated air is closed and the air is sucked out of the component interior, as a result of which a reduced pressure is generated in the component interior.

These two steps can be repeated periodically.

The component interior can be dried particularly efficiently via the two separate drying steps. For example, a complete drying of the component interior can be achieved, in which the operating medium of the component is demonstrably removed completely. For example, not only all liquid drops but also all or most moisture particles may be removed during complete drying of the component interior. The liquid is, for example, an operating liquid of the component, for example water.

The first drying step corresponds, for example, to “flushing” the component interior with heated air. The first drying step can result already in thorough pre-drying of the component interior. This is owing to the fact, for example, that warm air can generally absorb more moisture than cold air. The heating of the air flowing through the component interior is therefore helpful for increasing the drying efficiency. The heated air is, for example, ambient air, room air or a technical industrial gas which has been heated.

In this case, the temperature of the gas used for drying can be always controlled in order to avoid damage to the component as a result of excessively high temperature, while an excessively low temperature can delay the drying process.

The second drying step can serve, for example, to fully or completely remove from the interior of the component the residual moisture remaining after the first drying step. A vacuum pump can be used in the second drying step. In this case, a reduced pressure can be generated in order to suck out the air remaining in the component interior. In order to be able to generate a reduced pressure, the inlet for the heated air can be closed, such that for example no more air at all flows into the component interior.

During the second drying step, the pressure in the component interior is continuously monitored, for example, in order to recognize when the pressure falls below the desired target pressure, and to be able to end the process. Alternatively, if the target pressure is not reached within the stipulated time, it is possible to return again to the first drying step with heated industrial gas.

A component which finds application in a lithographic process chain is understood to mean, in particular, a component of a lithography apparatus and/or a component which is used in the checking, maintenance, production, cleaning, repair or the like of the lithography apparatus. By way of example, the component can be used during a mask inspection and/or mask repair. The component to be dried can be a collector unit of a lithography apparatus or some other component of such a lithography apparatus. The collector unit is a collecting optical unit that reflects in the direction of the illumination system the light generated by plasma in the light source of the lithography apparatus.

In accordance with an embodiment, the method furthermore comprises: ascertaining a moisture difference between the heated air blown into the component interior and the heated air sucked out of the component interior; and carrying out the second drying step as soon as the moisture difference falls below a predetermined moisture threshold value.

As a result, the drying of the component interior can be effected in a particularly efficient manner because a start time of the second drying step can be optimized. The process of ascertaining the moisture difference is for example a measurement that is carried out during the entire first drying step. For example, the second drying step can be carried out only if the moisture difference falls below the predetermined moisture threshold value. It is also possible for the first drying step to be interrupted only if the moisture difference falls below the predetermined moisture threshold value. In this case, the predetermined moisture threshold value can be a value stored in a memory.

In accordance with an embodiment, the method furthermore comprises: measuring a pressure in the component interior during the second drying step; ascertaining whether the measured pressure when carrying out the second drying step falls below a predetermined pressure threshold value within a predetermined time duration; and repeating the first drying step and the second drying step if it is ascertained that the measured pressure when carrying out the second drying step does not fall below the predetermined pressure threshold value within the predetermined time duration.

The process of measuring the pressure, for example the vapour pressure, can be effected for example at the outlet of the component interior. The two drying steps can be repeated as often as desired until the desired result is achieved, whereby the drying of the component interior can be effected particularly efficiently. For example, the moisture remaining in the interior is determined by a measurement of the pressure being carried out continuously during the second drying step. The component interior can be dry enough only if the pressure drops enough and falls below a pressure threshold value within the predetermined time duration (for example a few minutes). If this is not the case, that is to say if the decrease in pressure is too slow, the two drying steps can be repeated. The pressure measurement can be effected with the aid of a manometer. In this case, the predetermined pressure threshold value can be a value stored in a memory.

In accordance with an embodiment, the predetermined time duration is less than five minutes. For example, the predetermined time duration is three minutes. The second drying step is thus very short. In this case, the predetermined time duration can be a value stored in a memory.

In accordance with an embodiment, the predetermined pressure threshold value is below thirty, such as below twenty-three, millibars.

In accordance with a further embodiment, a temperature of the heated air is at most 40° C. Higher temperatures are generally undesirable, for example, because they could damage the component and/or could burn a technician carrying out the drying.

In accordance with an embodiment, the heated air is dried before being blown into the component interior. The process of blowing through predried air furthermore improves the drying because the dried air has an increased moisture absorptivity and a stable input parameter is thus obtained. It has been found that this defined initial state can be helpful in order to be able to make clear statements about process times and process stability.

In accordance with an embodiment, the method furthermore comprises a pre-drying step carried out before the first drying step, in which pre-drying step liquid, for example residual cooling water that has remained in the component interior, is sucked out by a wet-dry vacuum cleaner having a higher suction force than a wet-dry vacuum cleaner that sucks out the heated air in the first drying step. The wet-dry vacuum cleaner used in the first drying step is suitable for continuous running, for example.

The pre-drying step is carried out for example without heated air and serves to pump larger quantities of residual water (for example greater than 100 ml) out of the component.

In accordance with a second aspect, a method for testing the tightness of a component which finds application in a lithographic process chain is proposed. The method comprises: drying a component interior of the component in accordance with the method in accordance with the first aspect or in accordance with an embodiment of the first aspect;

and carrying out a tightness test using helium for determining the tightness of the component.

In the leak test or tightness test using helium, either helium can be passed into the closedoff interior of the component and vacuum can be generated all around, or the other way around. If helium is measured somewhere in the vacuum region, there is a leak. A size of the holes can be determined by the measurement of the emerging quantities of helium.

Dirt or water in front of the holes can “close” the latter and falsify the tightness test using helium. Therefore, it is desirable to dry the component interior. A reliability of the tightness test can thus be increased.

The embodiments and features described for the method in accordance with the first aspect and in accordance with an embodiment of the first aspect apply, mutatis mutandis, to the proposed method in accordance with the second aspect, and vice versa.

In accordance with a third aspect, a device for drying a component interior of a component which is usable in a lithographic process chain is proposed. The device comprises: a heat unit for admitting heated air into the component interior through an inlet; a suction unit in order that while the heated air is being blown in by the heat unit heated air is sucked out of the component interior through an outlet; at least one shutoff valve for closing the inlet; and a vacuum unit for generating a reduced pressure in the component interior and for sucking the air out of the component interior.

The heat unit and the suction unit form jointly, for example, the unit for pre-drying from the first drying step described above. The heat unit can be arranged upstream of the inlet to the component interior and generate warm air in a controlled manner, the warm air being admitted into the component interior. Instead of one shutoff valve, various shutoff valves can also be provided. The shutoff valves can guide the gas flows during the process.

The suction unit can be a wet-dry vacuum cleaner, for example from the industrial field. The vacuum cleaner can be suitable for continuous running, for example, because the drying using the vacuum cleaner can last a number of hours. For example, a vacuum cleaner with a brush motor is not suitable. Rather, a vacuum cleaner with a side channel compressor is used, for example.

The shutoff valves are, for example, valve types which tolerate both excess pressure and vacuum and seal off both.

The vacuum unit is, for example, a vacuum pump which initially can still pump residues of warm and moist air and at the same time can achieve a final pressure of significantly less than water vapour pressure. For example, a membrane pump is used.

The embodiments and features described for the method in accordance with the first aspect and in accordance with an embodiment of the first aspect apply, mutatis mutandis, to the proposed device in accordance with the third aspect, and vice versa.

"A(n); one" in the present case should not necessarily be understood as restrictive to exactly one element. Rather, a plurality of elements, such as, for example, two, three or more, can also be provided. Any other numeral used here, too, should not be understood to the effect that there is a restriction to exactly the stated number of elements. Rather, numerical deviations upwards and downwards are possible, unless indicated to the contrary.

Further possible implementations of the disclosure also comprise not explicitly mentioned combinations of features or embodiments that are described above or below with respect to the exemplary embodiments. In this case, a person skilled in the art will also add individual aspects as improvements or supplementations to the respective basic form of the disclosure.

Further configurations and aspects of the disclosure are the subject matter of the dependent claims and also of the exemplary embodiments of the disclosure described below. In the text that follows, the disclosure is explained in more detail on the basis of embodiments and with reference to the accompanying figures.

DETAILED DESCRIPTION

Identical elements or elements having an identical function have been provided with the same reference signs in the figures, unless indicated to the contrary. It should also be noted that the illustrations in the figures are not necessarily true to scale.

Figure 1A:
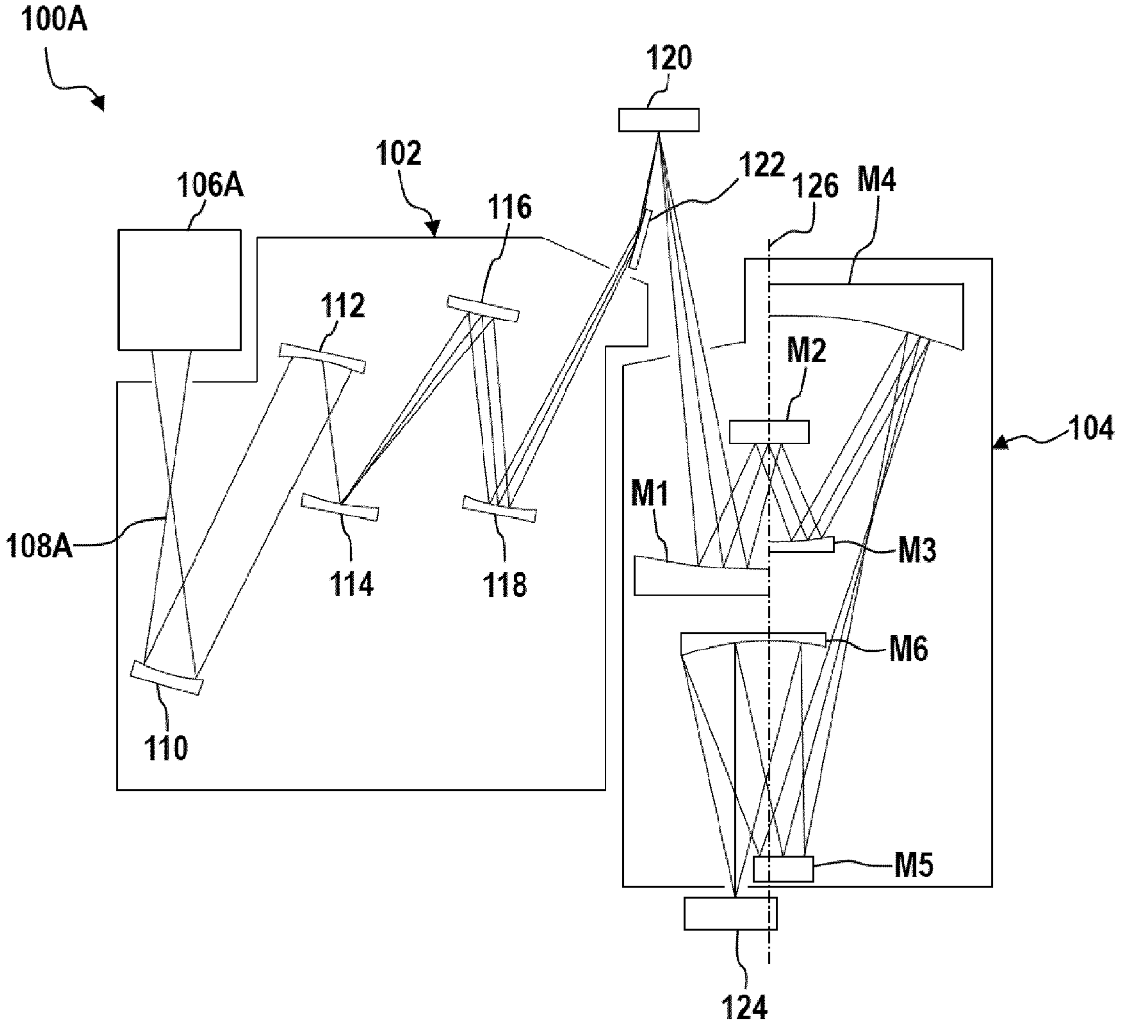
FIG. 1A shows a schematic view of an embodiment of an EUV lithography apparatus.

FIG. 1A shows a schematic view of an EUV lithography apparatus 100A comprising a beam-shaping and illumination system 102 and a projection system 104. In this case, EUV stands for "extreme ultraviolet" and denotes a wavelength of the working light of between 0.1 nm and 30 nm. The beam-shaping and illumination system 102 and the projection system 104 are respectively provided in a vacuum housing (not shown), wherein each vacuum housing is evacuated with the aid of an evacuation device (not shown). The vacuum housings are surrounded by a machine room (not shown), in which drive devices for mechanically moving or setting optical elements are provided. Moreover, electrical controllers and the like can also be provided in this machine room.

The EUV lithography apparatus 100A comprises an EUV light source 106A. A plasma source (or a synchrotron), which emits radiation 108A in the EUV range (extreme ultraviolet range), that is to say for example in the wavelength range of 5 nm to 20 nm, can for example be provided as the EUV light source 106A. In the beam-shaping and illumination system 102, the EUV radiation 108A is focused and the desired operating wavelength is filtered out from the EUV radiation 108A. The EUV radiation 108A generated by the EUV light source 106A has a relatively low transmissivity through air, for which reason the beam-guiding spaces in the beam-shaping and illumination system 102 and in the projection system 104 are evacuated.

The beam-shaping and illumination system 102 illustrated in FIG. 1A has five mirrors 110, 112, 114, 116, 118. After passing through the beam-shaping and illumination system 102, the EUV radiation 108A is guided onto a photomask (reticle) 120. The photomask 120 is likewise embodied as a reflective optical element and can be arranged outside the systems 102, 104. Furthermore, the EUV radiation 108A can be directed onto the photomask 120 via a mirror 122. The photomask 120 has a structure which is imaged onto a wafer 124 or the like in a reduced fashion via the projection system 104.

The projection system 104 (also referred to as a projection lens) has six mirrors M1 to M6 for imaging the photomask 120 onto the wafer 124. In this case, individual mirrors M1 to M6 of the projection system 104 can be arranged symmetrically in relation to an optical axis 126 of the projection system 104. It should be noted that the number of mirrors M1 to M6 of the EUV lithography apparatus 100A is not restricted to the number represented. A greater or lesser number of mirrors M1 to M6 can also be provided. Furthermore, the mirrors M1 to M6 are generally curved at their front sides for beam shaping.

Figure 1B:
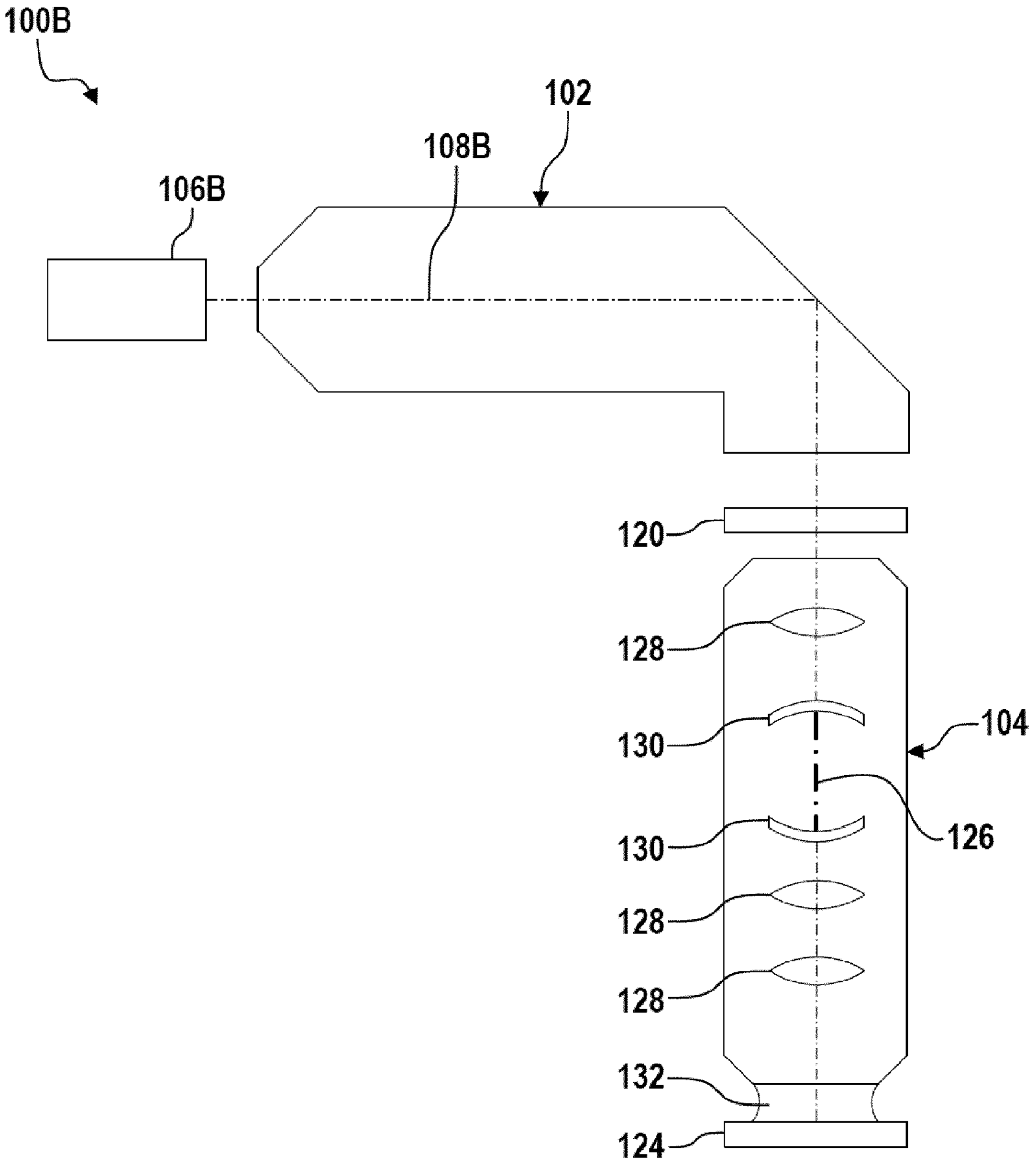
FIG. 1B shows a schematic view of an embodiment of a DUV lithography apparatus.

FIG. 1B shows a schematic view of a DUV lithography apparatus 100B, which comprises a beam-shaping and illumination system 102 and a projection system 104. In this case, DUV stands for "deep ultraviolet" and denotes a wavelength of the working light of between 30 nm and 250 nm. As has already been described with reference to FIG. 1A, the beam-shaping and illumination system 102 and the projection system 104 can be arranged in a vacuum housing and/or be surrounded by a machine room with corresponding drive devices.

The DUV lithography apparatus 100B has a DUV light source 106B. By way of example, an ArF excimer laser that emits radiation 108B in the DUV range at 193 nm, for example, can be provided as the DUV light source 106B.

The beam-shaping and illumination system 102 illustrated in FIG. 1B guides the DUV radiation 108B onto a photomask 120. The photomask 120 is embodied as a transmissive optical element and can be arranged outside the systems 102, 104. The photomask 120 has a structure which is imaged onto a wafer 124 or the like in a reduced fashion via the projection system 104.

The projection system 104 has a plurality of lens elements 128 and/or mirrors 130 for imaging the photomask 120 onto the wafer 124. In this case, individual lens elements 128 and/or mirrors 130 of the projection system 104 can be arranged symmetrically in relation to an optical axis 126 of the projection system 104. It should be noted that the number of lens elements 128 and mirrors 130 of the DUV lithography apparatus 100B is not restricted to the number represented. A greater or lesser number of lens elements 128 and/or mirrors 130 can also be provided. Furthermore, the mirrors 130 are generally curved at their front side for beam shaping.

An air gap between the last lens element 128 and the wafer 124 may be replaced by a liquid medium 132 which has a refractive index of >1. The liquid medium 132 may be for example high-purity water. Such a construction is also referred to as immersion lithography and has an increased photolithographic resolution. The medium 132 can also be referred to as an immersion liquid.

Figure 2:
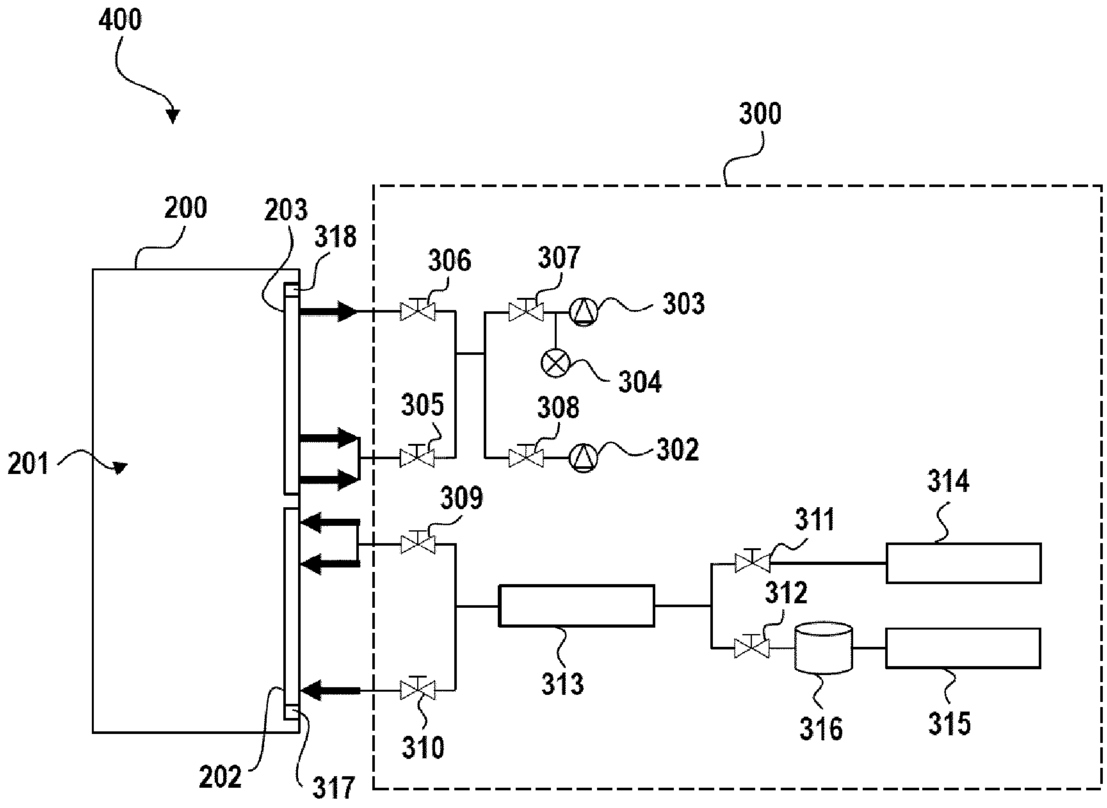
FIG. 2 shows a system for drying a component interior.

FIG. 2 shows a system 400 for drying a component interior 201 of a component 200. The component 200 is a collector (collector unit) of a lithography apparatus 100A, 100B. The collector 200 can correspond to the beam-shaping and illumination system 102 described above.

In the event of maintenance work on the collector 200, the latter is demounted from the lithography apparatus 100A, 100B and dried. For this purpose, it is connected to a drying device 300 (device) via an inlet 202 and an outlet 203.

The drying device 300 comprises a suction unit 302 embodied as a wet-dry vacuum cleaner for industrial applications, a vacuum unit or vacuum pump 303, a manometer 304, shutoff valves 305-312, a heat unit 313, an industrial gas container 314, a room air container 315 and a drying unit 316.

Figure 3:
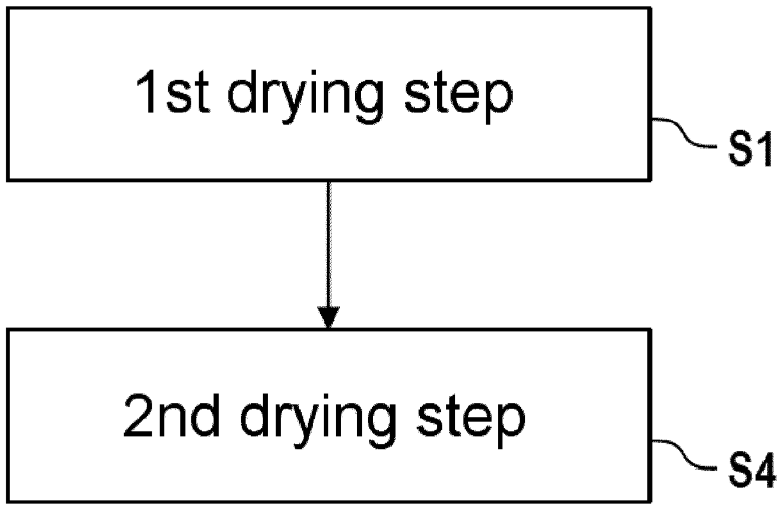
FIG. 3 shows a method for drying a component interior in accordance with a first embodiment.

The drying device 300 is suitable for being operated in accordance with the method for drying a component interior 201 in accordance with a first embodiment. Such a method is illustrated in FIG. 3.

In a step S1, corresponding to a first drying step S1, heated air is blown into the component interior 201 through the inlet 202. For this purpose, industrial gas and/or room air from the containers 314, 315 are/is heated to 40° C. by the heat unit 313 and blown into the component interior 201 through the inlet 202. This is illustrated by the arrows pointing towards the left in FIG. 2.

In the example in FIG. 2, the room air can optionally be dried by the drying unit or drying cartridge 316 in order that, when admitted into the component interior 201, it has a moisture of between two and ten percent and can absorb more moisture from the collector interior 201. The drying cartridge 316 here consists of two columns filled with silicate gel. What can be advantageous about the use of the drying cartridge 316 is that the moisture or general parameters of the input air is/are known. The drying cartridge 316 is furthermore portable owing to the silicate, for which reason the ambient air (room air) can be used as process gas. The drying cartridge 316 can be equipped with a bake-out device, as a result of which it includes high reusability.

Simultaneously therewith, in the first drying step S1, the heated air is sucked out of the interior 201 through the outlet 203. The heated air thus flows through the interior 201, collects moisture from the interior 201 and, while entraining the collected moisture, flows out of the interior 201 again through the outlet 203. The flowing out is represented by the arrows pointing towards the right in FIG. 2. The heated air is sucked out or pumped out with the aid of the vacuum cleaner 302.

The first drying step S1 is followed by a second drying step S4 (FIG. 2). In this step S4, the inlet 202 for the heated air is closed. This is done by the valves 309 and 310 being closed. In addition, the vacuum pump 303 is switched on in step S2. For this purpose, for example, the vacuum cleaner 302 is switched off via the valve 308 and the vacuum pump is switched in by the valve 307 being opened.

In step S4, the vacuum pump 303 generates a reduced pressure in the component interior 201 and thereby sucks the remaining air and liquid out of the component interior. The component interior 201 is dried efficiently as a result.

Figure 4:
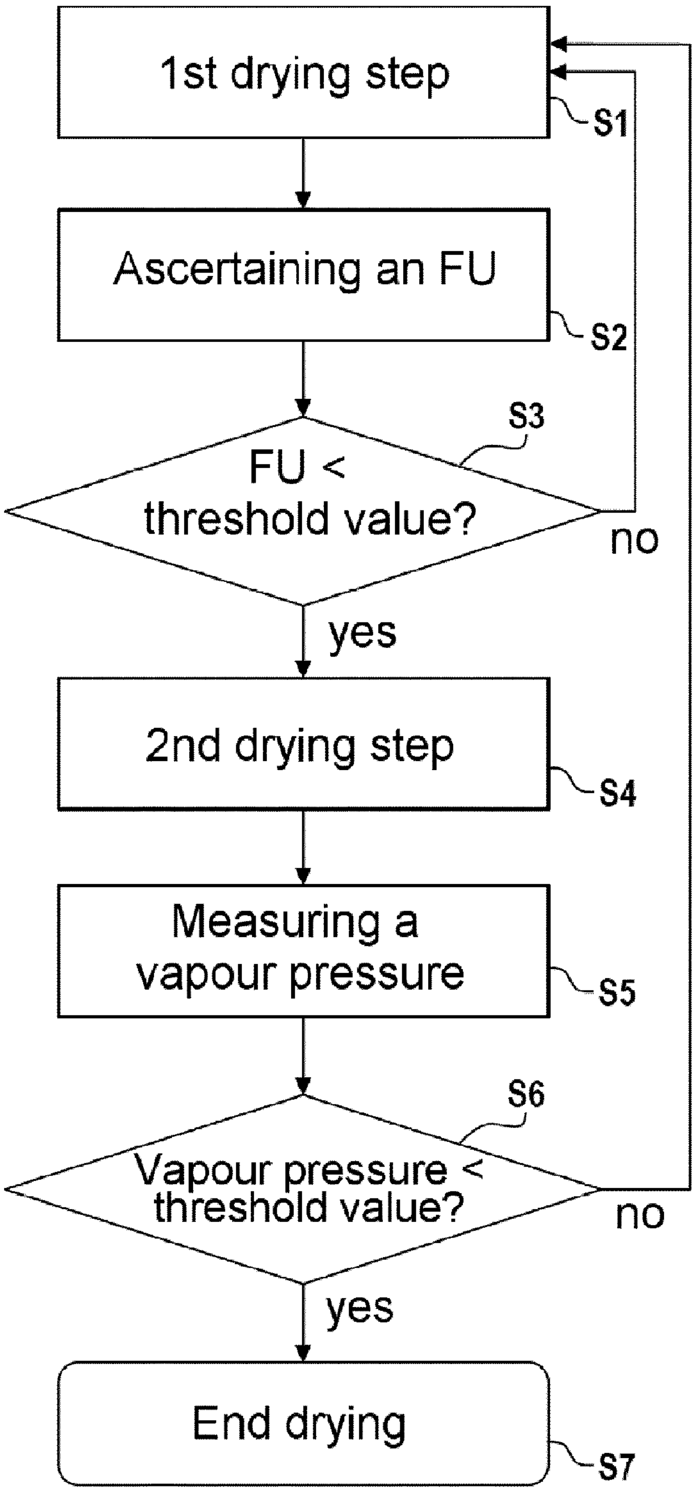
FIG. 4 shows a method for drying a component interior in accordance with a second embodiment.

The drying device 300 in FIG. 2 is furthermore suitable for being operated in accordance with the method for drying a component interior 201 in accordance with a second embodiment. Such a method is illustrated in FIG. 4.

Steps S1 and S4 remain the same and will therefore not be described again. Steps S2 and S3 can be part of the first drying step S1 or can be carried out after the first drying step S1. Likewise, steps S5 and S6 can be part of the second drying step S4 or can be carried out after the second drying step S4.

Step S2 comprises measuring or ascertaining a moisture difference FU between the air admitted through the inlet 202 and the air emerging from the outlet 203. Moisture sensors 317, 318 which are arranged at the inlet 202 and at the outlet 203 are used for determining the moisture difference FU. The moisture difference FU is formed from the difference between the moisture measured at the inlet 202 and the moisture measured at the outlet 203.

In step S3, the moisture difference FU measured in step S2 is compared with a previously stored moisture threshold value. If the moisture difference FU is less than the moisture threshold value, the method continues with the second drying step S4. Otherwise, the first drying step S1 is repeated. Steps S1-S3 are repeated until the moisture difference FU falls below the moisture threshold value.

During step S4, a pressure or vapour pressure at the outlet 203 is measured in step S5.

The manometer 304 is used for this purpose. The development of the pressure at the outlet 203 over a time period is measured in this case.

Step S6 involves ascertaining whether the measured pressure falls below a predetermined vapour pressure threshold value within a predetermined time duration of three minutes. If this is the case, the drying is ended in step S7. Otherwise, the method from FIG. 4 is started from the outset again.

After the drying method in FIG. 3 or 4, a helium test for determining the tightness of the component 200 can also be carried out.

The drying described above can also be effected in the context of component production.

Although the present disclosure has been described on the basis of exemplary embodiments, it is modifiable in diverse ways. For example, an excess pressure (for example 10 bar) can be present at the input of the containers 314, 315. It is also possible to vary the temperature at the heat unit 313. Furthermore, the device 300 can comprise more inputs than described above, which can result in a greater number of parallel valves 305, 306, 309, 310.

LIST OF REFERENCE SIGNS

100A EUV lithography apparatus
100B DUV lithography apparatus
102 Beam-shaping and illumination system
104 Projection system
106A EUV light source
106B DUV light source
108A EUV radiation
108B DUV radiation
110 Mirror
112 Mirror
114 Mirror
116 Mirror
118 Mirror
120 Photomask
122 Mirror
124 Wafer
126 Optical axis
128 Lens element
130 Mirror
132 Medium
200 Component
201 Component interior
202 Inlet

203 Outlet
300 Device
302 Suction unit
303 Vacuum unit
304 Manometer
305-312 Shutoff valve
313 Heat unit
314 Industrial gas container
315 Room air container
316 Drying unit
317, 318 Moisture sensor
400 System
FU Moisture difference
M1 Mirror
M2 Mirror
M3 Mirror
M4 Mirror
M5 Mirror
M6 Mirror
S1-S7 Method steps

What is claimed is:

1. A method for drying a component interior of a component usable in a lithographic process chain, the method comprising:

a) simultaneously admitting heated air into the component interior through an inlet and removing the heated air out of the component interior through an outlet;

b) ascertaining a moisture difference between the heated air admitted into the component interior and the heated air removed from the component interior, and c) when the moisture difference falls below a moisture threshold value, closing the inlet for the heated air and removing the air from the component interior, thereby reducing a pressure in the component interior.

2. The method of claim 1, further comprising:

during c) measuring a pressure in the component interior; and determining whether the measured pressure falls below a pressure threshold value within a time duration; and when the measured pressure does not fall below the pressure threshold value within the time duration, repeating a) and c).

3. The method of claim 2, wherein the time duration is less than five minutes.

4. The method of claim 3, wherein the pressure threshold value is below thirty millibars.

5. The method of claim 3, wherein the pressure threshold value is below 23 millibars.

6. The method of claim 2, wherein the pressure threshold value is below thirty millibars.

7. The method of claim 2, wherein the pressure threshold value is below 23 millibars.

8. The method of claim 1, wherein a temperature of the heated air is at most 40° C.

9. The method of claim 8, further comprising heating the air admitted into the component interior.

10. The method of claim 8, further comprising:

during c) measuring a pressure in the component interior; and determining whether the measured pressure falls below a pressure threshold value within a time duration; and when the measured pressure does not fall below the pressure threshold value within the time duration, repeating a) and c).

11. The method of claim 1, further comprising heating the air admitted into the component interior.

12. The method of claim 1, further comprising, before a), using a wet-dry vacuum cleaner to remove liquid from the interior of the component, wherein the wet-dry vacuum cleaner has a higher suction force than is used in a).

13. The method of claim 12, wherein the liquid removed using the wet-dry vacuum cleaner comprises residual cooling water.

14. The method of claim 1, wherein a) comprises blowing the heated air into the component interior.

15. The method of claim 1, further comprising, after c), using helium to perform a tightness test of the component.

16. The method of claim 1, wherein the component comprises a component usable to check, maintain, produce, clean, or repair the lithography apparatus.

17. The method of claim 1, wherein the component comprises a collector unit.

18. A device configured to drying a component interior of a component usable in a lithographic process chain, the device comprising:

a heat unit configured to heat air and admit the heated air into the component interior through an inlet;

a suction unit configured so that, while the heated air is being admitted in by the heat unit, heated air is removed from the component interior through an outlet;

a shutoff valve configured to close the inlet when a moisture difference between the heated air blown into the component interior and the heated air removed from of the component interior falls below a moisture threshold value; and a vacuum unit configured to generate a reduced pressure in the component interior and to remove air out from the component interior when the inlet is closed.

19. The device of claim 18, wherein the component comprises a component usable to check, maintain, produce, clean, or repair the lithography apparatus.

20. The device of claim 18, wherein the component comprises a collector unit.

* * * * *